United States Patent
Oprescu-Surcobe et al.

(10) Patent No.: US 8,195,166 B1
(45) Date of Patent: Jun. 5, 2012

(54) METHODS FOR MOBILITY MANAGEMENT OF USER EQUIPMENT IN A LONG TERM EVOLUTION SYSTEM

(75) Inventors: Valentin Oprescu-Surcobe, Northbrook, IL (US); Peter M. Drozt, Prairie Grove, IL (US); Michael F. Korus, Eden Prairie, MN (US); Donald G. Newberg, Hoffman Estates, IL (US); Aparna Pandey, Chicago, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 0 days.

(21) Appl. No.: 12/981,923

(22) Filed: Dec. 30, 2010

(51) Int. Cl.
*H04W 36/00* (2009.01)
(52) U.S. Cl. ........................... 455/436; 455/439
(58) Field of Classification Search ............ 455/432.1, 455/436–444
See application file for complete search history.

(56) References Cited

U.S. PATENT DOCUMENTS

| | | | |
|---|---|---|---|
| 6,038,449 A * | 3/2000 | Corriveau et al. | 455/439 |
| 7,260,074 B2 | 8/2007 | Vare | |
| 2003/0236827 A1 | 12/2003 | Patel et al. | |
| 2006/0025151 A1 | 2/2006 | Karaoguz et al. | |
| 2009/0154408 A1 | 6/2009 | Jeong et al. | |

* cited by examiner

Primary Examiner — Nick Corsaro
Assistant Examiner — Joel Ajayi
(74) Attorney, Agent, or Firm — Valerie M. Davis (57) ABSTRACT

A UE connected to a serving cell: determines a set of virtual channels of interest to the UE; determines that the UE is in one of a plurality of ACTIVE states; detects occurrence of an event effecting service availability for the UE; and determines behavior of the UE based on the ACTIVE state of the UE and the occurrence of the event. A UE in an IDLE state: determines a set of virtual channels of interest to the UE; determines a list of cells, wherein each cell in the list supports at least one of the virtual channels; determines a candidate subset of the list of cells, wherein inclusion of a cell in the candidate subset is based on whether or not the UE is receiving on a downlink path of one of the virtual channels; and selects one of the cells in the candidate subset as a target cell.

16 Claims, 3 Drawing Sheets

METHODS FOR MOBILITY MANAGEMENT OF USER EQUIPMENT IN A LONG TERM EVOLUTION SYSTEM

REFERENCE TO RELATED APPLICATIONS

The present application is related to the following U.S. applications commonly owned together with this application by Motorola, Inc.:

Ser. No. 12/981,985, filed Dec. 30, 2010, titled "Method and System for Selecting a Target Cell for Handover of User Equipment in a Long Term Evolution System" by Oprescu, et al.; and Ser. No. 12/982,208, filed Dec. 30, 2010, titled "Method for Managing Resource Utilization in a Long Term Evolution Communication System" by Oprescu, et al.

TECHNICAL FIELD

The technical field relates generally to communication systems and more particularly to mobility management of user equipment in a Long Term Evolution communication system.

BACKGROUND

Long Term Evolution (LTE) is a radio technology designed to increase the capacity and speed of mobile telephone networks and provides for an end-to-end Internet Protocol (IP) service delivery of media. Currently, LTE comprises a set of enhancements to the Universal Mobile Telecommunications System (UMTS), which is described in a suite of Technical Specifications (TS) developed within and publicized by $3^{rd}$ Generation Partnership Project (3GPP), with the most recent version of the 3GPP TSs being published in September 2010.

LTE, in part, provides for a flat IP-based network architecture designed to ensure support for, and mobility between, some legacy or non-3GPP systems such as, for instance, GPRS (general packet radio service) and WiMAX (Worldwide Interoperability for Microwave Access). Some of the main advantages with LTE are high throughput, low latency, plug and play, FDD (frequency-division duplex) and TDD (time-division duplex) in the same platform, improved end user experience, simple architecture resulting in low operating costs, and interoperability with older standard wireless technologies such as GSM (Global Systems for Mobile Communications), cdmaOne™, W-CDMA (UMTS), and CDMA2000®.

Many major carriers in the United States (US) and several worldwide carriers have started to convert their networks to LTE. In addition, public safety agencies in the US (including US Intelligence Services) have endorsed LTE as the preferred technology for the new 700 MHz public safety radio band.

Due to the mission critical nature of public safety, it is important that user equipment (UE) operated by public safety personnel maintain service continuity while moving throughout the LTE system. More particularly, when a UE undergoes a handover from one cell to another cell, as the UE moves in the LTE system, it is essential that the UE move to a cell that supports the UE's current channel (for continuity of service) or at a minimum supports at least one channel of interest to the UE. However, this is not always possible in current LTE systems.

Current LTE systems typically contain numerous cells covering multiple geographical areas, with many of these cells supporting different groups of channels. Current mechanisms of selecting a cell for UE handover utilize signal strength measurements, wherein, for example, the cell with the strongest signal could be selected as a target for handover. However, this is not sufficient to guarantee continuity of service since the strongest signal does not necessarily come from a cell that carries or is capable of carrying a channel of interest for a given UE; and, in the case of Multimedia Broadcast Multicast Service (MBMS) channels, the selected cell may not even support the channel on which the UE is active or any channels of interest to the UE, for that matter.

Thus, there exists a need for methods managing mobility of UE in an LTE system.

BRIEF DESCRIPTION OF THE FIGURES

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required. Apparatus and method components have been represented, where appropriate, by conventional symbols in the drawings, showing only those specific details that are pertinent to understanding the various embodiments so as not to obscure the disclosure with details that will be readily apparent to those of ordinary skill in the art, having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to an embodiment, a UE that is connected to a serving cell: determines a set of virtual channels of interest to the UE; determines that the UE is in one of a plurality of ACTIVE states based on whether or not the UE is transmitting or receiving on one of the virtual channels of interest to the UE; detects occurrence of an event effecting service availability for the UE; determines behavior of the UE based on the ACTIVE state of the UE and the occurrence of the event.

Pursuant to another embodiment, a UE in an IDLE state: determines a set of virtual channels of interest to the UE;

determines a list of cells, wherein each cell in the list supports at least one virtual channel of interest to the UE; determines a candidate subset of the list of cells, wherein each cell in the subset is a candidate for becoming a serving cell, wherein inclusion in the candidate subset is based on whether or not the UE is receiving on a downlink path of one of the virtual channels of interest to the UE; and selects one of the cells in the candidate subset as a target cell.

Using the various teachings herein, some advantages include: a reduction in the amount of signaling involved at the UE and the eNodeB by preventing radio frequency (RF) measurement reporting of eNodeB and resultant handover to the eNodeB, which do not support channels of interest to the UE; a reduction in the chances of dropping a channel during a talk spurt; and an extension of battery life in a UE by preventing useless RF measurements of eNodeBs that are not true candidates for handover for a UE. Those skilled in the art will realize that the above recognized advantages and other advantages described herein are merely illustrative and are not meant to be a complete rendering of all of the advantages of the various embodiments.

Figure 1:
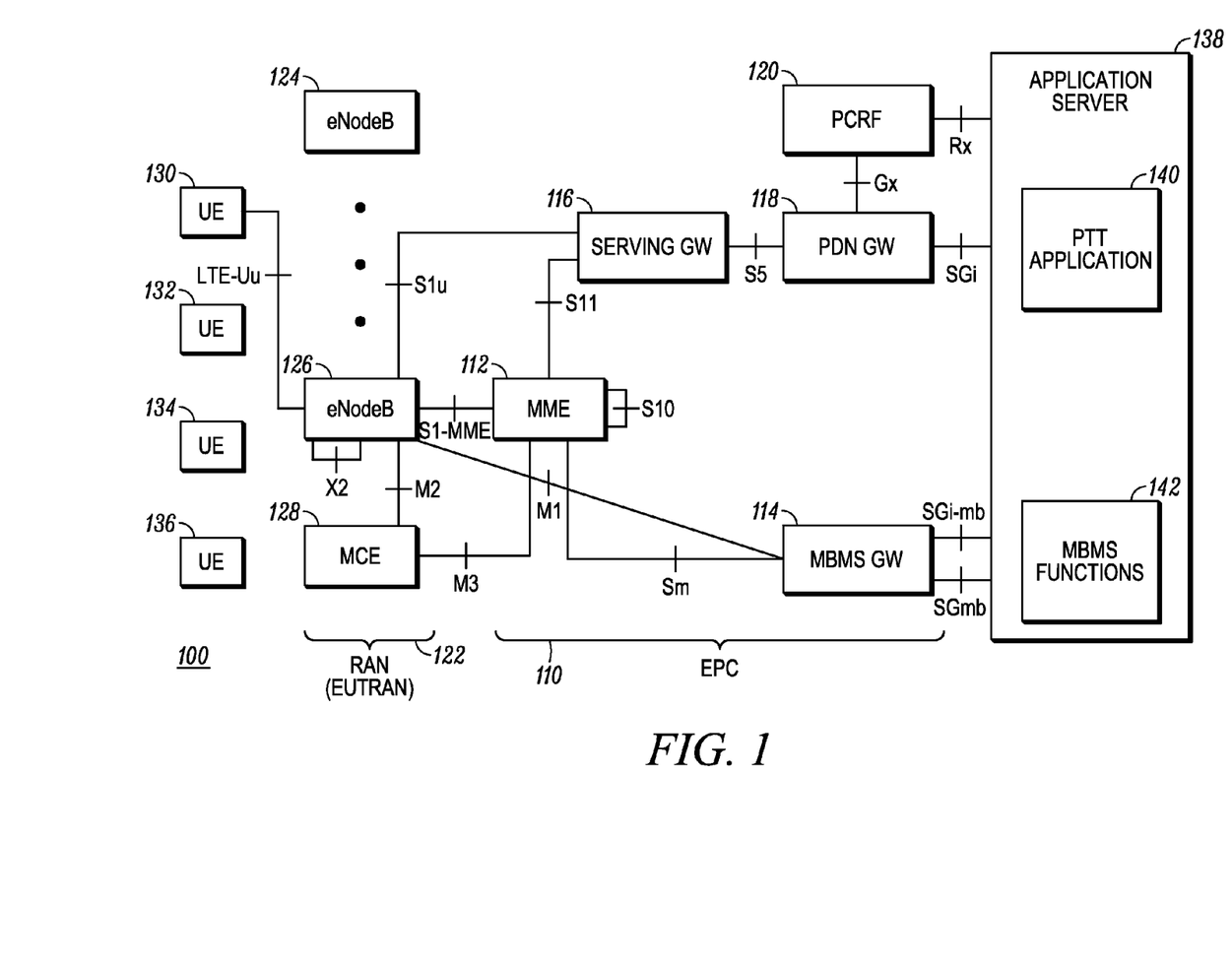
FIG. 1 is a system diagram of a communication system that implements methods for managing mobility of UE in an LTE system in accordance with some embodiments.

Referring now to the drawings, and in particular FIG. 1, a communication system in accordance with some embodiments is shown and indicated generally at 100. System 100 includes system elements of: an LTE Evolved Packet Core (EPC) 110 having a number of logical elements (including a Mobility Management Entity (MME) 112, a Multimedia Broadcast Multicast Service Gateway (MBMS GW) 114, a Serving Gateway (SGW) 116, a Packet Data Network Gateway (PDN GW) 118, and a Policy and Charging Rules Function (PCRF) 120); an access network (in this case a radio access network (RAN)) 122 that includes a plurality of eNodeB (LTE base station) infrastructure devices 124 and 126 and a Multicast Control Entity (MCE) 128; a plurality of UE 130, 132, 134, and 136; and an application server (AS) 138 shown, for illustration and not as a limiting factor, as having logical entities of a Push-to-Talk application 140 and MBMS functions 142. In general, the EPC and the RAN are referred to collectively as the LTE system. The elements of communication system 100 and the interfaces between them are further described below.

The RAN 122 elements, EPC 110 elements, application server 138, and UE 130 to 136 implement protocols and signaling in accordance with 3GPP TSs; and the terms LTE communication system, LTE system, and Evolved Packet System (EPS) are used interchangeably herein and are each defined as being inclusive of the RAN 122 and the EPC 110 but not inclusive of the application server 138 or the UE. By contrast, the application server 138 is included in a network of a service provider for the UE, and communications between the application server 138 and the UE are facilitated using the LTE system. Moreover, only a limited number of EPC elements and UE, and one application server and RAN are shown in the diagram, but more such elements may be included in an actual commercial or private system implementation; and only one UE is shown connected to an eNodeB, and one eNodeB is shown connected to the EPC for ease of illustration. Also, the RAN can be any type of access network, including any 2G, e.g., GSM, or 3G, e.g., UMTS, access network.

In general, the UE, the application server 138, the EPC 110 logical elements, and the RAN 122 elements are each implemented using (although not shown) a memory, one or more network interfaces, and a processing device that are operatively coupled, and which when programmed form the means for these system elements to implement their desired functionality, for example as illustrated by reference to the method shown in FIG. 2. The network interfaces are used for passing signaling, also referred to herein as messaging, (e.g., messages, packets, datagrams, frames, superframes, and the like) between the elements of the system 100. The implementation of the network interface in any particular element depends on the particular type of network, i.e., wired and/or wireless, to which the element is connected.

Where the network supports wireless communications, the interfaces comprise elements including processing, modulating, and transceiver elements that are operable in accordance with any one or more standard or proprietary wireless over-the-air interfaces, wherein some of the functionality of the processing, modulating, and transceiver elements may be performed by means of the processing device through programmed logic such as software applications or firmware stored on the memory device of the system element or through hardware.

The processing device utilized by the UE, the application server 138, the EPC 110 logical elements, and the RAN 122 elements may be programmed with software or firmware logic or code for performing functionality described by reference to FIG. 2; and/or the processing device may be implemented in hardware, for example, as a state machine or ASIC (application specific integrated circuit) to perform such functionality. The memory implemented by these system elements can include short-term and/or long-term storage of various information needed for the functioning of the respective elements. The memory may further store software or firmware for programming the processing device with the logic or code needed to perform its functionality.

We now turn to a brief description of the functionality of the system elements shown in FIG. 1, which will aid in the understanding of the later description of the method illustrated in FIG. 2. The UE 130, 132, 134, and 136, which are also referred to in the art as subscribers, communication devices, access devices, access terminals, mobile stations, mobile subscriber units, mobile devices, user devices, and the like, can be any type of communication device such as radios, mobile phones, mobile data terminals, Personal Digital Assistants (PDAs), laptops, two-way radios, cell phones, and any other device capable of operating in a wired or wireless environment and that can be used by public users (such as consumers) or private users (such as public safety users).

When a UE attaches to the LTE system, via the RAN, it is connected to the appropriate core network (i.e., MME, SGW, and PDN GW) based on an identity of a service provider sent by the UE. Mobility management for UE is classified based on the radio technologies of source (i.e., serving) and candidate or target LTE cells and the mobility-state of the UE, wherein a cell is defined as being inclusive of a single eNodeB's coverage area or a portion of an eNodeB's coverage area and can be identified by a cell identifier. Pursuant to this understanding of the relationship between cells and eNodeBs, within this text, the terms "cell" and "eNodeB" may be used on occasion interchangeably, without loss of clarity. In addition, the abbreviation eNB may be used in lieu of eNodeB.

From a mobility perspective, the UE can be in one of three states, DETACHED, IDLE, and ACTIVE. The DETACHED state is defined as a transitory state in which the UE is powered-on but is in the process of searching for and registering with the LTE system.

The ACTIVE state (also referred to herein as a "connected" state or the UE being connected to a serving cell) is defined as a state in which the UE is registered with the LTE system and has an RRC (radio resource control) connection with an eNodeB or cell. Thus, a UE is deemed to have an "LTE connection" when the UE is in an ACTIVE state and has an RRC connection with a cell, and when the UE to MME signaling connection has been established. In this ACTIVE state, the LTE system knows the cell to which the UE belongs and can receive/transmit data to and from the UE over bearer resources dedicated to the UE.

Also, in the ACTIVE state, when a UE moves between two LTE cells, "backward" handover or predictive handover is carried out. In this type of handover, the serving cell, based on RF measurement reports from the UE, determines a target cell and queries the target cell if it has enough bearer resources to accommodate the UE. The target cell also prepares bearer resources before the serving cell commands the UE to handover to the target cell. In an LTE system, it is the responsibility of the current (or serving) cell to instruct the UE to send RF measurement reports and based on these reports, to prepare a target cell to accept the UE, and finally to hand the UE over to the target cell.

Accordingly, as the terms are used herein, a handover is defined as a transition of a UE's LTE connection from a serving cell to a target cell, or a movement of a UE from one cell to a target cell to establish an LTE connection. A serving cell is defined as a cell to which a UE has a current LTE connection. A candidate cell is defined as a potential target cell. A target cell is the actual cell selected: for handover of a given UE; for establishing an LTE connection for the UE when the UE is in an IDLE state; for continuing to receive a downlink bearer when the UE is in an IDLE state; or that supports a virtual channel of interest of the UE. A neighboring cell is a cell having an adjacent geographic coverage area to a UE's serving cell or to a cell in which the UE is currently located while in the IDLE state.

The IDLE state is defined as a power-conservation state for the UE, where the UE is not transmitting or receiving packets on a dedicated or default bearer but can receive MBMS service. In the IDLE state, no context about the UE is stored in the eNodeB, and the location of the UE is only known at the MME and only at the granularity of a tracking area (TA) that may include multiple eNodeBs. The MME knows the TA in which the UE last registered, and paging is necessary to locate the UE to a cell.

The application server 138 is an infrastructure device that supports applications (executed in a processing device) or provision of services to UE over the LTE system. Such applications include, but are not limited to, PTT services, PTV (Push-to-Video) services, PTX (push-to-anything) services via unicast or multicast. The multicast can be delivered through an EPS by way of unicast service or MBMS Service. In an embodiment, the application server 138 is an infrastructure element of a Public Land Mobile Network (PLMN) of a public safety agency to which the UE have access. As such, the application server may be, for instance, a computer aided dispatch (CAD) server, a media server, a call controller, etc. As illustrated, the application server 138 could include the PTT application 140 and, if broadcast/multicast is used for delivery, the MBMS functions 142. The PTT application 140 facilitates media delivery to the UE that have PTT capabilities. The MBMS functions 142, which are typically associated with a Broadcast-Multicast Service Center (BM-SC), manage MBMS services to the UE and are the source of MBMS traffic. The MBMS functions 142 include, for example, authorization for terminals requesting to activate a MBMS service, scheduling of broadcast and multicast services, integrity and confidentiality protection of MBMS data, MBMS session announcement, and serving as an entry point for content providers or any other broadcast/multicast source that is external to the LTE system. Moreover, although MBMS point-to-multipoint (PTM) functions 142 are illustratively shown, the application server 138 can, alternatively, be configured with any suitable PTM (e.g., broadcast and/or multicast) capabilities.

The EPC 110 is an all-IP core network that provides mobile core functionality that, in previous mobile generations (2G, 3G), has been realized through two separate sub-domains: circuit-switched (CS) for voice and packet-switched (PS) for data. The EPC 110 enables the above-mentioned all IP end-to-end delivery of media: from mobile handsets and other user equipment with embedded IP capabilities, over IP-based eNodeBs, across the EPC and throughout the application domain, IMS (IP Multimedia Subsystem) and non-IMS.

As mentioned above, The EPC 110 comprises the logical components of the MME 112, the MBMS GW 114, the SGW 116, the PDN GW 118, and the PCRF 120 and further comprises the, respective, interfaces (also referred to in the art as reference points) between these logical entities. The logical entities of the EPC 110 are shown as separate logical blocks and indeed can, in some embodiments, each be included in separate hardware devices or can, alternatively, be combined in one or more hardware devices. Also, the EPC 110, depending on the size of the network, may have several such components serving thousands or tens of thousands of UE and serving many application servers. Additional known elements and interfaces in an EPC as described in the 3GPP TSs for LTE that are needed for a commercial or private embodiment of the EPC 110 are not shown in FIG. 1 for the sake of clarity.

Turning first to the MME 112, this EPC element is the key control-node for UE access on the LTE system. It is responsible for IDLE mode UE tracking and paging procedures, including retransmissions. It is involved in the bearer activation/deactivation process and is also responsible for choosing the SGW for a UE at the initial attach and at time of intra-LTE handover involving Core Network (CN), i.e., MME, SGW, PDN GW, node relocation. The MME 112 is responsible for authenticating the user (by interacting with an HSS, not shown). Non-Access Stratum (NAS) signaling generated using a NAS protocol terminates at the MME 112, and the MME 112 is also responsible for generation and allocation of temporary identities or identifiers to UE. The MME 112 further checks the authorization of the UE to camp on the service provider's PLMN and enforces UE roaming restrictions.

In the control-plane, the NAS protocol, which runs between the MME 112 and the UE, is used for control-purposes such as network attach, authentication, setting up of bearers, and mobility management. Unlike in other systems, in LTE the allocation and maintenance of bearers is independent of the connection state of the UE, in the sense that a UE may be connected and not have bearers allocated to it and conversely, a UE may be idle but have allocated bearers.

As used herein, the term bearer or bearer resource is defined as a transmission path in a network (such as a RAN) and is used to carry UE data traffic (also termed, herein, as communications or service data flows (SDFs)). An EPS bearer is defined as a bearer that extends between the UE and the PDN GW and encompasses both a wireless path (UE to eNodeB), as well as a network transport path (eNodeB to PDN GW). A bearer can be bidirectional, i.e., having both an uplink path from the UE to the application server and a downlink path from the application server to the UE; or a bearer can be unidirectional, such as a common point-to-multipoint (PTM) downlink path from the application server to the UE for MBMS traffic.

A bearer can be point-to-point (PTP) (such as a unicast bearer), or a PTM bearer (such as a MBMS bearer) and has associated therewith a set of characteristics or attributes including, but not limited to, Quality of Service (QoS), a carrier frequency at which data is modulated, a particular bandwidth, bit rate, etc. A default bearer is defined as a non-GBR (guaranteed bit rate) bearer that provides for "best effort" SDF transmission and is allocated to a UE for the duration of its attachment to the LTE system and need not be explicitly requested. A dedicated bearer is defined as any additional bearer that is established for the same UE and is specifically requested by (or on behalf of) a UE and can be either non-GBR or GBR.

The MBMS GW 114 is an entry point in the LTE system, and it distributes MBMS traffic to all eNodeBs within MBMS service areas. MBMS may use Single Frequency Network (SFN) transmission, also referred to as MBSFN. In MBSFN, the transmission happens from a time-synchronized set of eNodeBs in the service area, using the same resource blocks. IP multicast can be used for distributing the traffic from the MBMS GW 114 to the different eNodeBs. The MCE 128 in the RAN 122 ensures that the same resource blocks are allocated for a given service across all the eNodeBs of a given MBSFN area. It is the task of the MCE 128 to ensure that RLC (Radio Link Control)/MAC (Media Access Control) layers at the eNodeBs are appropriately configured for MBSFN operation.

The SGW 116 routes and forwards user point-to-point data packets, while also acting as the mobility anchor for the user plane during inter-eNodeB handovers and as the anchor for mobility between LTE and other 3GPP technologies.

The PDN GW 118 provides connectivity to the UE to external packet data networks (PDNs) by being the point of exit and entry of traffic for the UE. A UE may have simultaneous connectivity with more than one PDN GW for accessing multiple PDNs. The PDN GW 118 performs policy enforcement, packet filtering for each user, charging support, lawful interception and packet screening. Another key role of the PDN GW 118 is to act as the anchor for mobility between 3 GPP and non-3GPP technologies such as WiMAX and 3GPP2 (CDMA 1X and EvDO). The PCRF 120 provides policy and charging rules to the PDN GW to support its SDF detection, policy enforcement, and flow-based charging functions.

RAN 122 in this embodiment is a E-UTRAN (Evolved UMTS Terrestrial Radio Access Network) comprising multiple cells each served by an eNodeB, e.g., 124, 126, which serve as the intermediate infrastructure device between the UE and the EPC 110 and a point of access for the UE to allocated bearers. Each cell represents a geographic coverage area that provides the wireless resources termed herein as bearers for carrying data (or SDFs) for UE connected to the RAN. An RRC layer in the eNodeB makes handover decisions based on neighbor cell RF measurement reports sent by the UE, pages for the UE over the air, broadcasts system information, controls UE RF measurement reporting such as the periodicity of Channel Quality Information (CQI) reports, and allocates cell-level temporary identifiers to active UE. The RRC layer also executes transfer of UE context from the serving cell to the target cell during handover, and does integrity protection of RRC messages. In addition, the RRC layer is responsible for the setting up and maintenance of EPS bearer resources.

Regarding the LTE reference points, the UE communicates its signaling with an eNodeB via an LTE-Uu reference point. An S1-MME reference point is used for the control plane protocol (e.g., eRANAP which uses Stream Control Transmission Protocol (SCTP) as the transport protocol) between the E-UTRAN (e.g., via the eNodeB 126) and the MME 112.

An S1u reference point between the eNodeB 126 (E-UTRAN) and the SGW 116 is used for the per-bearer user plane tunneling and inter-eNodeB path switching during handover, wherein the transport protocol over this interface is GPRS Tunneling Protocol-User plane (GTP-U). An X2 reference point is used for inter-eNodeB communications.

An S5 reference point provides user plane tunneling and tunnel management between the SGW 116 and the PDN GW 118 and is used for SGW relocation due to UE mobility and if the SGW needs to connect to a non-collocated PDN GW for the required PDN connectivity. Both GTP and IETF (Internet Engineering Task Force) based Mobile IP protocols are used over this interface.

A Gx reference point provides transfer of QoS policy and charging rules from the PCRF 120 to a Policy and Charging Enforcement Function (PCEF, not shown) in the PDN GW 118. An Rx reference point resides between the PCRF 120 and an Application Function (AF, not shown) in the application server 138 for control signaling. An S10 reference point resides between MMEs for MME relocation and MME to MME information transfer. An S11 reference point resides between the MME 112 and SGW 116 for corresponding signaling.

An SGi reference point resides between the PDN GW 118 and a packet data network (in this case a PDN that includes the application server 138), such as an operator-external public or private PDN or an intra-operator PDN, e.g., for provision of IMS services. The SGi reference point corresponds to a Gi reference point for 2G/3G accesses.

For supporting the PTM signaling provided by MBMS (in this illustrative embodiment), an SG-mb reference point between the MBMS GW 114 and the application server 138 supports MBMS bearer signaling for setting up and releasing context at MBMS session establishment and termination and also may support user related signaling, e.g. for Multicast session authorization, or user session joining or detach. An SGi-mb reference point between the MBMS GW 114 and the application server 138 supports the MBMS traffic plane. An M1 reference point between the MBMS GW 114 and the eNodeB 126 makes use of an IP multicast protocol for the delivery of packets to eNodeBs. The traffic plane "payload" is encapsulated in SYNC protocol data units (PDUs). An M2 reference point between the eNodeB 126 and the MCE 128 is used by the MCE 128 to provide the eNodeB with radio configuration data. An M3 reference point between the MME 112 and the MCE 128 supports the MBMS session control signaling, e.g. for session initiation and termination. An Sm reference point provides for communications between the MBMS GW 114 and the MME 112 to support the PTM services.

A PTM bearer is generally associated with a service and is identified via a Temporary Mobile Group Identity (TMGI). Between the eNodeB and the UE, the PTM (MBMS) bearer takes the form of a Multicast Traffic Channel or MBMS PTM Traffic Channel (MTCH), with the traffic associated to a specific TMGI being carried by a specific MTCH at any given time. The PTM (MBMS) bearer also has a MBMS PTM Control Channel (MCCH) associated therewith between the eNodeB and a UE in a connected or IDLE state, wherein control plane information for a specific TGMI can be sent to the UE. Within a MBSFN area, several MTCHs being transmitted with the same modulation and coding levels can be grouped in one MCH transport channel. Common signaling is carried out at both the RRC layer and at the MAC layer.

As used herein, the term virtual channel (VC) means an identifiable information flow between a media source and a set of target UE associated with the virtual channel. In general, it is possible to have several virtual channels active at the same time in a service area. A virtual channel can be seen as a logical representative of a communication service and/or the group of users to which the information flow is addressed, e.g., a talkgroup. To receive the desired content, the UE must identify and decode a downlink bearer to which the virtual channel is mapped. If one or more MBMS PTM bearers are used for a virtual channel, each bearer may consist of an MTCH and the associated portions of the RAN and of the EPC bearers that traverse the SGi-mb and M1 interfaces.

A UE can be a content source for a virtual channel by using an uplink bearer (also interchangeably referred to herein as an uplink path) associated with (or mapped to or for) a virtual channel to send media to an application server; or the UE can receive content on a virtual channel over a unicast PTP or broadcast PTM downlink bearer (also interchangeably referred to herein as a downlink path) for the virtual channel. As used herein, an active virtual channel means a virtual channel having current transmissions (activity), e.g., voice, video, text, etc. (collectively referred to herein as "data" or "media" or "traffic"), on one or more of the bearers for the virtual channel. By contrast, an inactive virtual channel means a virtual channel in which no transmissions have occurred on any of the associated bearers for the virtual channel for a time period exceeding a known time threshold.

Figure 2:
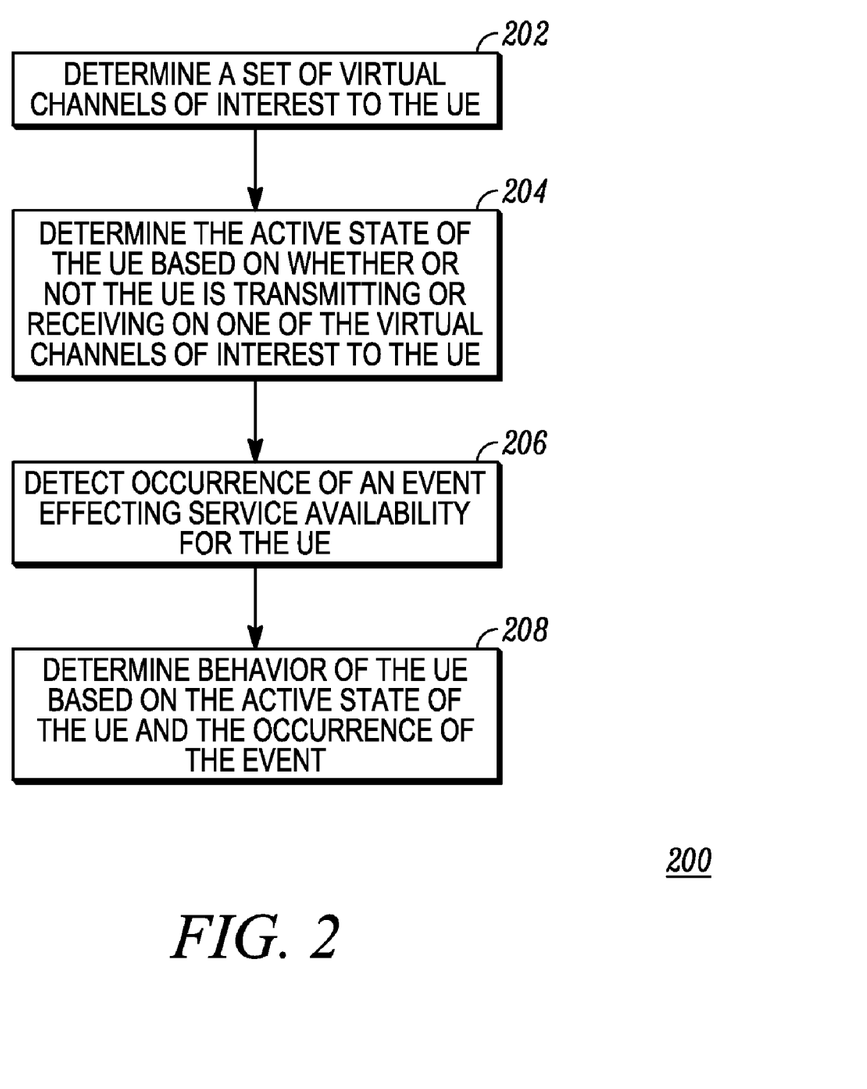
FIG. 2 is a flow diagram illustrating a method performed by a UE for managing mobility of the UE in an LTE system while the UE is in a connected state, in accordance with some embodiments.

Turning now to FIG. 2, a flow diagram illustrating a method for mobility management of a UE in a LTE system is shown and generally indicated at 200. The functionality illustrated by method 200 is performed in a UE. For implementation of method 200, it is assumed that the UE (e.g., UE 130) has an LTE connection to a serving cell (e.g., eNodeB 126) and is in an ACTIVE state, such that the serving cell can provide access to bearers that support one or more virtual channels of interest to the UE and such that the serving cell can perform handover procedures for the connected UE.

In accordance with method 200, the UE determines (202) a set of virtual channels "of interest" to the UE, wherein the virtual channels of interest to the UE are defined as, at least, the one or more virtual channels, wherein the UE is authorized to decode and view or listen to the traffic sent on the virtual channel and/or authorized to send traffic on the virtual channel. There are a number of ways in which the UE can obtain or generate (e.g. upon user login) a list of its or its user's virtual channels of interest (as used herein reference to the UE's virtual channels of interest also include the user's virtual channels of interest, if any). The UE can be configured or pre-programmed with the list of virtual channels of interest and may be further configured with identifiers for these virtual channels (e.g., talkgroup identifiers). The list can be added and maintained via device management, including using over-the-air techniques. The application server 138 could broadcast the information regarding the UE's virtual channels of interest on a well-known channel of a well-known SFN. In another implementation, new information can be sent, automatically or via user input, at any time to the UE to update the list of virtual channels and/or a mapping of virtual channels to eNodeBs. In yet another implementation, a list of virtual channels can be specific to a user of the UE. For example, shared devices may store a larger list and a sub-list can be selected and activated based on login of a particular user.

To further implement embodiments of the present teachings, the UE also obtains or generates knowledge of the virtual channels supported by the serving cell in which the UE is located or camped (which is the UE's serving cell when the UE is LTE connected). More particularly, the UE "knows" (e.g., has stored therein) an internal listing of the MTCHs that the cell "supports", meaning provides access to the UE via one or more uplink or downlink bearer paths, within its coverage area; and the UE is also configured with software to map supported virtual channels to their MTCHs, for example, based on information received from the application server or received over a common control channel. The UE also obtains knowledge of virtual channels supported by each of a plurality of the neighboring cells to the cell in which it is located. This "plurality" of neighboring cells may include all of the neighboring cells, but more likely only includes some of the neighboring cells.

The UE "determines" or otherwise obtains knowledge of the virtual channels supported by the cell in which it is located and the neighboring cells via pre-configuration, notifications from an infrastructure element such as the application server, notifications from the cells, any other suitable method, or a combination of these methods. For example, the list of virtual channels supported by a particular eNodeB, and optionally its neighboring cells, could be advertised on an MCCH of one or more MBMS downlink paths. Then the UE can scan a common point-to-multipoint channel, for instance, of the cell in which the UE is located and a common point-to-multipoint channel of one or more neighboring cells (e.g., each neighboring cell) having a signal strength above a minimum threshold, in order to build the mapping of virtual channels to eNodeBs and to, thereby, build the list of cells that support its virtual channels of interest. Depending on the particular implementation, the virtual channels supported by the cell in which the UE is located and its neighboring cells can be provided to the UE using any suitable messaging such as messages, information elements and/or fields within packets, datagrams, etc., and point-to-point or point-to-multipoint (MCCH) bearers already being communicated between these entities and the UE.

Also, during handover of a UE from a previous cell to a serving cell, the previous cell might provide to the UE the virtual channels supported by the previous cell and one or more other neighboring cells. In addition, cells may be programmed to, on some periodic or non-periodic basis broadcast the virtual channels supported at the cell. Other mechanisms for providing information regarding virtual channels supported at neighboring cells can be envisioned within the context of the teachings herein.

Turning back to method 200, at 204, the UE determines one of a plurality of ACTIVE states, where and the particular ACTIVE state depends on whether or not the UE is transmitting or receiving on one of its virtual channels of interest. The UE also detects (206) occurrence of an event affecting service availability for the UE, and determines (208) its own behavior based on its ACTIVE state and on the particular event that occurred. In addition, in some scenarios of the present teachings, the UE also determines whether an "unrelated" application (e.g. uploading or downloading e-mail) is "running" meaning being implemented or executed on the UE and causing the UE to communicate information (e.g. media or control information) with the serving cell without using one of the virtual channels of interest. An application, as used herein, means a software application or software code.

More particularly, the UE can be in one of three connected states: transmitting on an uplink path of one of its virtual channels of interest; receiving on a downlink path of one of its virtual channels of interest; or neither receiving nor transmitting on a virtual channel of interest. Generally, a particular user equipment is not receiving and transmitting at the same time, such as with PTT applications. However, this is not a requirement for implementing the present teachings.

Furthermore, three events of significance may occur that affect service availability for a UE. As used herein, affecting service availability means affecting whether or not the UE is within cell coverage to continue current communications on one of its virtual channels of interest or to start future communications on one of its virtual channels of interest. The three events include: the UE getting ordered to IDLE state by the serving cell; the UE receiving a handover command from the serving cell; and the UE determining that a time has arrived to send to the serving cell a radio frequency (RF) measurement report for another cell.

The first three scenarios that will be described apply when the UE is LTE connected to a serving cell and is transmitting on an uplink path of one of its virtual channels of interest (the one of its virtual channels is also referred to as a "first" virtual channel of interest or simply a first virtual channel). In each case, the virtual channel on which the UE is transmitting has both an uplink path and a downlink path, and this virtual channel supports (or carries or transports) media transmissions for a first application running on the UE, such as a PTT application. In the first scenario, the UE is transmitting on the uplink path of a first virtual channel of interest, and the event that affects service availability for the UE is an order or command, from the serving cell, for the UE transition to an IDLE state. This command can occur due to a forced loss of floor control for the transmitting UE, for instance, where the UE's transmissions are being preempted to allow transmissions by another UE. The command can be provided to the UE (as well as any other order or command) on a common control channel, for instance, that the UE monitors or on any other bearer, e.g., a default bearer or an MBMS downlink path, that the UE monitors.

In this case, the UE proceeds to transition to the IDLE state, and while in the IDLE state, automatically switches to listening to the downlink path of the same virtual channel (e.g. of a first virtual channel of interest) on which it had been previously transmitting. This assumes that the downlink path is available as an MBMS transmission that the UE can receive in IDLE state. This UE behavior is different in that a UE normally does not automatically transition to listening to a downlink path of the same virtual channel when its uplink path is preempted.

In the second scenario, the UE is transmitting on the uplink path, and the event that affects service availability for the UE is the UE receiving, from the serving cell, a command to execute a handover to a target cell. In accordance with the present teachings, the UE first determines whether the target cell supports the first virtual channel. When the target cell supports the first virtual channel, the UE executes the handover to the target cell so that it can continue its communications with a less likelihood of its call being dropped.

When the target cell does not support the first virtual channel, but a second "unrelated" application that does not use the first virtual channel is running on the UE and is exchanging information with the serving cell, the UE still executes the handover to the target cell to continue the information exchange for the other application. The UE further releases or causes the release of a bearer that comprises the uplink path on which the UE was transmitting since the UE no longer has access to the first virtual channel while in the coverage area of the target UE. In all other instances, the UE ignores the command to execute the handover to the target cell so that it can continue its transmission on the first virtual channel, thereby essentially "blocking" handover to the target cell. This UE behavior is different in that a UE normally executes a handover unconditionally and indiscriminately without the above evaluation, and the UE normally preserves all of its bearers.

In the third scenario, the UE is transmitting on the uplink path, and the event that affects service availability for the UE is the UE determining that a time has arrived to send to the serving cell a radio frequency (RF) measurement report for another cell. For example, the serving cell may have instructed the UE to provide these measurement reports in some periodic or non-periodic basis for certain neighboring serving cells. However, in accordance with the present teachings, the UE may withhold sending the measurement report for a serving cell while implementing the following novel behavior. Again, the UE determines whether the other cell supports the first virtual channel. When the other cell supports the first virtual channel, the UE proceeds to send the RF measurement report for the other cell, since the other cell is a suitable target cell for the UE to continue its current transmissions.

In addition, when the other cell does not support the first virtual channel, and a second application that does not use the first virtual channel is running on the UE and is exchanging information with the serving cell, the UE still sends the RF measurement report for the other cell since the UE can at the very least continue to exchange information for this other application, even though the UE would not have coverage to continue its transmissions. Otherwise the UE withholds sending (i.e., does not send) the RF measurement report for the other cell, which effectively removes this cell as being a target cell for handover. This UE behavior is different in that a UE normally sends the measurement report unconditionally and indiscriminately without the above evaluation, and also does not check other applications running on the UE.

The next three scenarios apply when the UE is LTE connected to a serving cell and is receiving on a downlink path of one of its virtual channels of interest (the one of its virtual channels is also referred to as a "first" virtual channel of interest or simply a first virtual channel). In each case, the virtual channel on which the UE is receiving has a downlink path, and this virtual channel supports (or carries or transports) media transmissions for a first application running on the UE, such as a PTT application. In the first scenario, the UE is receiving on the downlink path of a first virtual channel of interest, and the event that affects service availability for the UE is an order or command, from the serving cell, for the UE transition to an IDLE state. In this case, the UE proceeds to transition to the IDLE state, and then autonomously (i.e., without eNodeB intervention, switches from listening to the downlink path of the first channel in the connected state to listening to the downlink path of the first virtual channel while in the IDLE state. This UE behavior is different in that a UE normally does not automatically transition to listening to the downlink path in the IDLE state without being instructed to do so by the serving cell.

In the second scenario, the UE is receiving on the downlink path, and the event that affects service availability for the UE is the UE receiving, from the serving cell, a command to execute a handover to a target cell. In accordance with the present teachings, the UE first determines whether the target cell supports the first virtual channel. When the target cell supports the first virtual channel, the UE executes the handover to the target cell so that it can continue its communications with a less likelihood of its call being dropped.

When the UE determines that the target cell does not support the virtual channel, the UE determines whether a second application that does not use the first virtual channel is running on the UE and exchanging information with the serving cell. When such an application is running, the UE further compares a priority level of the application supporting the downlink communications to which the UE is currently receiving (e.g., the first application) to a priority level of the second application. When the priority level of the second application is at least the same as the priority of the first application, the UE executes the handover and correspondingly ceases reception on the downlink path of the first virtual channel. Otherwise, if no other application is running, or the second application has a lower priority than the first application, the UE ignores the handover command.

The UE compares priorities of the two applications so that the UE can continue communications for the application having the higher priority, even at a lower signal quality level. In an alternative implementation, the priority of the two applications is not compared, and the UE executes the handover if the second application is running regardless of the priority level of the second application. Moreover, any suitable policy can be used by the UE to determine whether to execute the handover command when the second application is running on the UE.

In the third scenario, the UE is receiving on the downlink path, and the event that affects service availability for the UE is the UE determining that a time has arrived to send to the serving cell a RF measurement report for another cell. The UE determines whether the other cell supports the first virtual channel. When the other cell supports the first virtual channel, the UE proceeds to send the RF measurement report for the other cell, since the other serving cell is a suitable target cell for the UE to continue its current communications. When the other cell does not support the first virtual channel, the UE determines whether a second application that does not use the first virtual channel is running on the UE and exchanging information with the serving cell. When such an application is running, the UE further compares a priority level of the first application to a priority level of the second application.

When the priority level of the second application is at least the same as the priority of the first application, the UE still sends the RF measurement report for the other cell. Otherwise, if no other application is running, or the second application has a lower priority than the first application, the UE withholds sending (i.e., does not send) the RF measurement report for the other cell. In an alternative implementation, the priority of the two applications is not compared, and the UE sends the RF measurement report if the second application is running regardless of the priority level of the second application. Moreover, any suitable policy can be used by the UE to determine whether to send the RF measurement report when the second application is running on the UE.

The next three scenarios apply when the UE is LTE connected to a serving cell and is in an ACTIVE state wherein the UE is neither receiving nor transmitting on any of its virtual channels of interest. In the first scenario, the event that affects service availability for the UE is an order or command, from the serving cell, for the UE transition to an IDLE state. In this case, the UE simply proceeds to transition to the IDLE state.

In the second scenario, the event that affects service availability for the UE is the UE receiving, from the serving cell, a command to execute a handover to a target cell. In accordance with the present teachings, the UE first determines whether the target cell supports any virtual channels of interest to the UE. When the target cell supports one or more virtual channels of interest to the UE, the UE executes the handover to the target cell. In addition, when the target cell does not support any of the virtual channels of interest to the UE, but an application that does not use any of the virtual channels of interest is running on the UE and exchanging information with the serving cell, the UE also executes the handover to the target cell. Otherwise, the UE ignores the command to execute the handover to the target cell.

In the third scenario, the event that affects service availability for the UE is the UE determining that a time has arrived to send to the serving cell a RF measurement report for another cell. In accordance with the present teachings, the UE first determines whether the other cell supports any virtual channels of interest to the UE. When the other cell supports one or more virtual channels of interest to the UE, the UE sends the RF measurement report for the other cell. In addition, when the other cell does not support any of the virtual channels of interest to the UE, and an application that does not use any of the virtual channels of interest to the UE is running on the UE and exchanging information with the serving cell, the UE sends the RF measurement report for the other cell. Otherwise, the UE withholds sending the RF measurement report for the other cell.

Figure 3:
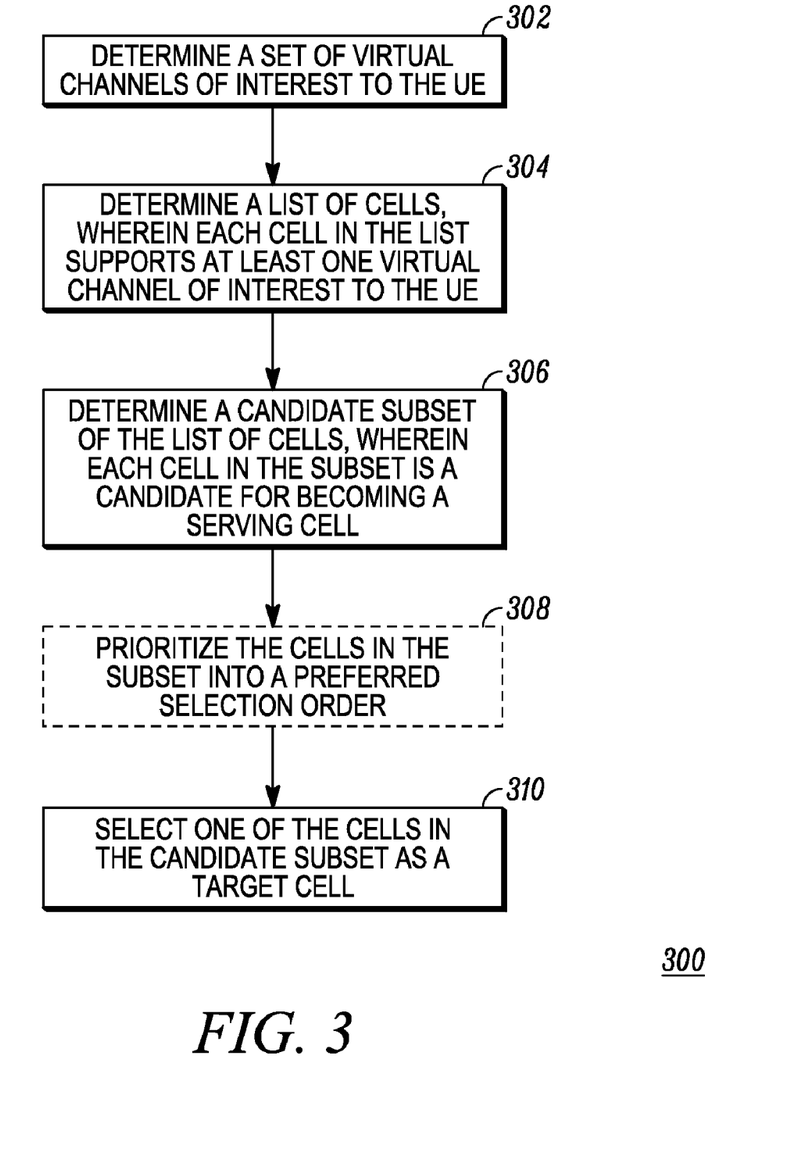
FIG. 3 is a flow diagram illustrating a method performed by a UE for managing mobility of the UE in an LTE system while the UE is in an idle state, in accordance with some embodiments.

Turning now to FIG. 3, a flow diagram illustrating a method for mobility management of a UE in a LTE system is shown and generally indicated at 300. The functionality illustrated by method 300 is performed in a UE. For implementation of method 300, it is assumed that the UE does not have an LTE connection to a serving cell and is, therefore, in an IDLE state. In accordance with method 300, the UE determines (302) a set of virtual channels of interest to the UE. A description of how a UE can determine and update its virtual channels of interest is provided above and will not be repeated here for the sake of brevity. At 304, UE determines a list of cells, wherein each cell in the list supports or provides coverage for one or more virtual channels of interest to the UE.

As described above, the UE obtains or builds (using one or more suitable techniques) and stores a mapping of virtual channels to eNodeBs. From this mapping, the UE can determine and store a list of cells, with the list including only those eNodeBs that support virtual channels of interest to the UE. As further mentioned above, the UE can be preprogrammed with the stored mapping of virtual channels to eNodeBs to build the list of cells; or the UE can build the list of cells by scanning a common point-to-multipoint channel of the cell in which the UE is currently located and a common point-to-multipoint channel of one or more neighboring cells having a signal strength above a minimum threshold.

From this list of cells, the UE can determine (306) a "candidate" subset of the cells in the list, wherein each cell in this subset is a candidate for becoming a serving cell when the UE connects to the LTE network. As used herein, a subset means the remaining cells resulting from an analysis by the UE on the list of cells to determine candidate cells; and the subset may include all of the cells of the original list, a portion of the cells in the list, or may be a "null" subset meaning that the subset has no cells included therein.

In some illustrative implementations, the selection of the cells in the candidate subset is based on whether or nor the UE is receiving on one of its virtual channels of interest, i.e., whether there is activity on any of the virtual channels of interest to the UE. For example, when the UE is active on a virtual channel, such as by receiving on a downlink path associated with a particular virtual channel, the UE includes in the candidate subset of cells all of the cells from the list of cells that support that particular virtual channel and have a signal strength above a minimum threshold. Any measure of signal strength can be used such as signal-to-noise ratio, etc.

If none of the cells in the list supports the virtual channel having activity (i.e., the candidate subset is null), the UE has a couple of options. First, the UE could include in the subset of candidate cells, one or more cells that support a different virtual channel of interest for the UE. Alternatively, if the transmission area (and the associated MBSFN) is extendable, the UE could request the cell in which the UE is currently located to add or initiate adding a new neighboring cell, which the UE then includes in the subset of candidate cells that supports the virtual channel of interest having activity or that supports at least one virtual channel of interest to the UE. Alternatively, when the candidate subset is initially null, the UE could revert to the technique that the UE uses for determining a candidate subset when the UE is not receiving on a virtual channel, i.e., when all of the virtual channels of interest are inactive. This involves simply selecting all of the cells from the list that have a signal strength above a minimum threshold.

Returning to method 300, once the candidate subset is determined, in one illustrative implementation at 308, the UE prioritizes the cells in the subset into a preferred selection order. The prioritization can be performed based on any suitable parameter including, but not limited to, signal strength of each cell in the candidate subset and/or a total number of virtual channels of interest supported by each cell in the candidate subset. For instance, candidate cells having a stronger signal are placed higher or more preferred for selection as a serving cell than those cells having lower signal strength. Moreover, when candidate cells have equal signal strength, the selection order can be based upon the total number of virtual channels supported by the cells, with the candidate cells supporting more virtual channels being more preferred for selection as a serving cell than those cells supporting fewer numbers of virtual channels. These, of course, are just some examples of prioritization mechanisms. Finally, at 310, the UE selects one of the cells in the candidate subset as a target cell, i.e., the next serving cell for the UE.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for managing resource utilization in a LTE communication system described herein. The non-processor circuits may include, but are not limited to, a radio receiver, a radio transmitter, signal drivers, clock circuits, power source circuits, and user input devices. As such, these functions may be interpreted as steps of a method to perform managing resource utilization in a LTE communication system described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a non-transient computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for mobility management of user equipment (UE) in a long term evolution (LTE) system, the method comprising:
a UE connected to a serving cell, the UE performing:
determining a set of virtual channels of interest to the UE;
determining that the UE is in one of a plurality of ACTIVE states based on whether or not the UE is transmitting or receiving on one of the virtual channels of interest to the UE;
detecting occurrence of an event effecting service availability for the UE;
determining behavior of the UE based on the ACTIVE state of the UE and the occurrence of the event;
wherein a first virtual channel of the plurality of virtual channels of interest to the UE comprises an uplink path and a downlink path, wherein the first virtual channel supports media transmissions for a first application on the UE, wherein the ACTIVE state comprises the UE transmitting on the uplink path, wherein the event comprises the UE receiving, from the serving cell, a command to execute a handover to a target cell, the UE performing:
determining whether the target cell supports the first virtual channel;
when the target cell supports the first virtual channel, executing the handover to the target cell;
when the target cell does not support the first virtual channel, but a second application that does not use the first virtual channel is running on the UE and is exchanging information with the serving cell, executing the handover to the target cell, and releasing a bearer that comprises the uplink path;
otherwise, ignoring the command to execute the handover to the target cell.

2. The method of claim 1, wherein a first virtual channel of the plurality of virtual channels of interest to the UE comprises an uplink path and a downlink path, wherein the ACTIVE state comprises the UE transmitting on the uplink path, wherein the event comprises an order, from the serving cell, to transition the UE to an IDLE state, the method further comprising:
the UE performing:
transitioning to the IDLE state;
listening to the downlink path of the first virtual channel while in IDLE state.

3. The method of claim 1, wherein a first virtual channel of the plurality of virtual channels of interest to the UE comprises an uplink path and a downlink path, wherein the first virtual channel supports media transmissions for a first application on the UE, wherein the ACTIVE state comprises the UE transmitting on the uplink path, wherein the event comprises the UE determining that a time has arrived to send to the serving cell a radio frequency (RF) measurement report for another cell, the method further comprising:
the UE performing:
determining whether the other cell supports the first virtual channel;
when the other cell supports the first virtual channel, sending the RF measurement report for the other cell;
when the other cell does not support the first virtual channel, and a second application that does not use the first virtual channel is running on the UE and is exchanging information with the serving cell, sending the RF measurement report for the other cell;
otherwise withholding sending the RF measurement report for the other cell.

4. The method of claim 1, wherein a first virtual channel of the plurality of virtual channels of interest to the UE comprises at least a downlink path, wherein the ACTIVE state comprises the UE receiving on the downlink path, wherein the event comprises an order, from the serving cell, to transition the UE to an IDLE state, the method further comprising:
the UE performing:
transitioning to the IDLE state;
continuing to receive on the downlink path of the first virtual channel, while in the IDLE state.

5. A method for mobility management of user equipment (UE) in a long term evolution (LTE) system, the method comprising:
a UE connected to a serving cell, the UE performing:
determining a set of virtual channels of interest to the UE;
determining that the UE is in one of a plurality of ACTIVE states based on whether or not the UE is transmitting or receiving on one of the virtual channels of interest to the UE;
detecting occurrence of an event effecting service availability for the UE;
determining behavior of the UE based on the ACTIVE state of the UE and the occurrence of the event;
wherein a first virtual channel of the plurality of virtual channels of interest to the UE comprises a downlink path, wherein the first virtual channel supports media transmissions for a first application on the UE, wherein the ACTIVE state comprises the UE receiving on the downlink path, wherein the event comprises the UE receiving, from the serving cell, a command to execute a handover to a target cell,
the UE performing:
determining that the target cell does not support the first virtual channel;
when a second application that does not use the first virtual channel is running on the UE and exchanging information with the serving cell and has at least the same priority as the first application, executing the handover to the target cell and ceasing reception on the downlink path,
otherwise, ignoring the command to execute the handover to the target cell.

6. The method of claim 5, wherein a first virtual channel of the plurality of virtual channels of interest to the UE comprises a downlink path, wherein the first virtual channel supports media transmissions for a first application on the UE, wherein the ACTIVE state comprises instead the UE receiving on the downlink path, wherein the event comprises the UE determining that a time has arrived to send to the serving cell a radio frequency (RF) measurement report for another cell, the method further comprising:
the UE performing:
determining whether the other cell supports the first virtual channel;
when the other cell supports the first virtual channel, sending the RF measurement report for the other cell;
when the other cell does not support the first virtual channel, and a second application that does not use the first virtual channel is running on the UE and exchanging information with the serving cell and has at least the same priority as the first application, sending the RF measurement report for the other cell;

otherwise, withholding sending the RF measurement report for the other cell.

7. A method for mobility management of user equipment (UE) in a long term evolution (LTE) system, the method comprising:
the UE performing:
determining a set of virtual channels of interest to the UE;
detecting occurrence of an event effecting service availability for the UE;
determining behavior of the UE based on the state of the UE and the occurrence of the event;
when UE is in an ACTIVE state and not transmitting or receiving on any of its virtual channels of interest, and the UE receives, from the serving cell, a command to execute a handover to a target cell, the UE performing:
determining whether the target cell supports any virtual channel in the plurality of virtual channels of interest to the UE;
when the target cell supports a virtual channel in the plurality of virtual channels of interest to the UE, executing the handover to the target cell;
when the target cell does not support any of the virtual channels in the plurality of virtual channels of interest to the UE, but an application that does not use any of the virtual channels of interest to the UE is running on the UE and exchanging information with the serving cell, executing the handover to the target cell;
otherwise, ignoring the command to execute the handover to the target cell.

8. The method of claim 7 further comprising:
when the UE is in the ACTIVE state and the UE is not transmitting or receiving on any of its virtual channels of interest, when the UE determines that a time has arrived to send to the serving cell a radio frequency (RF) measurement report for another cell:
the UE performing:
determining whether the other cell supports any virtual channel in the plurality of virtual channels of interest to the UE;
when the other cell supports a virtual channel in the plurality of virtual channels of interest to the UE, sending the RF measurement report for the other cell;
when the other cell does not support any of the virtual channels in the plurality of virtual channels of interest to the UE, and an application that does not use any of the virtual channels of interest to the UE is running on the UE and exchanging information with the serving cell, sending the RF measurement report for the other cell;
otherwise, withholding sending the RF measurement report for the other cell.

9. The method of claim 7 further comprising:
when the UE in an IDLE state, the UE performing:
determining a list of cells, wherein each cell in the list supports at least one virtual channel of interest to the UE;
determining a candidate subset of the list of cells, wherein each cell in the subset is a candidate for becoming a serving cell, wherein inclusion in the candidate subset is based on whether or not the UE is receiving on a downlink path of one of the virtual channels of interest to the UE;
selecting one of the cells in the candidate subset as a target cell.

10. The method of claim 9 further comprising prioritizing the cells in the candidate subset into a preferred selection order.

11. The method of claim 10, wherein the prioritizing is based on signal strength of each cell in the candidate subset.

12. The method of claim 10, wherein the prioritizing is based on a number of virtual channels of interest supported by each cell in the candidate subset.

13. The method of claim 9, wherein determining the list of cells comprises building the list of cells by scanning a common point-to-multipoint channel of a cell in which the UE is currently located and a common point-to-multipoint channel of at least one neighboring cell having a signal strength above a minimum threshold.

14. The method of claim 9, wherein the UE is receiving on a downlink path of a first virtual channel of interest, wherein determining the candidate subset comprises determining all cells from the list of cells that support the downlink path of the first virtual channel and that have a signal strength above a minimum threshold.

15. The method of claim 14, when the candidate subset is initially null, determining a subsequent candidate set by determining all cells from the list of cells having a signal strength above a minimum threshold.

16. The method of claim 9, wherein the UE is not receiving on a downlink path of any of the virtual channels of interest, wherein determining the candidate subset comprises selecting cells from the list of cells that have a signal strength above a minimum threshold.

* * * * *

UNITED STATES PATENT AND TRADEMARK OFFICE
CERTIFICATE OF CORRECTION

| | |
|---|---|
| PATENT NO. | : 8,195,166 B1 |
| APPLICATION NO. | : 12/981923 |
| DATED | : June 5, 2012 |
| INVENTOR(S) | : Oprescu-Surcobe et al. |

It is certified that error appears in the above-identified patent and that said Letters Patent is hereby corrected as shown below:

In Column 14, Line 54, delete "nor" and insert -- not --, therefor.

Signed and Sealed this
Fifteenth Day of January, 2013

David J. Kappos
*Director of the United States Patent and Trademark Office*